(12) United States Patent
Mikawa (10) Patent No.: US 8,866,966 B2
(45) Date of Patent: Oct. 21, 2014

(54) IMAGE EDITING APPARATUS, IMAGE EDITING METHOD, AND STORAGE MEDIUM STORING IMAGE EDITING PROGRAM

(75) Inventor: Takuma Mikawa, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1541 days.

(21) Appl. No.: 12/329,015

(22) Filed: Dec. 5, 2008

(65) Prior Publication Data

US 2009/0147131 A1    Jun. 11, 2009

(30) Foreign Application Priority Data

Dec. 7, 2007    (JP) ................. 2007-317212

(51) Int. Cl.
| | | |
|---|---|---|
| H04N 7/01 | (2006.01) | |
| G11B 27/034 | (2006.01) | |
| G11B 27/34 | (2006.01) | |
| H04N 21/4402 | (2011.01) | |
| H04N 21/44 | (2011.01) | |

(52) U.S. Cl.
CPC ...... *G11B 27/034* (2013.01); *H04N 21/440281* (2013.01); *H04N 21/440272* (2013.01); *H01N 21/854* (2013.01); *G11B 27/34* (2013.01); *H04N 21/44008* (2013.01)
USPC ...................................... 348/445

(58) Field of Classification Search
CPC .... G11B 27/34; G11B 27/034; H04N 21/854; H04N 21/440272
USPC ................. 386/218, 219, 230; 348/445
See application file for complete search history.

(56) References Cited

U.S. PATENT DOCUMENTS

| | | | |
|---|---|---|---|
| 6,400,375 B1 * | 6/2002 | Okudaira ............... | 345/668 |
| 7,103,260 B1 | 9/2006 | Hinson | |
| 2004/0239792 A1 * | 12/2004 | Shibutani et al. ........ | 348/333.12 |
| 2005/0134693 A1 * | 6/2005 | Torimoto et al. ........ | 348/207.99 |
| 2008/0019594 A1 * | 1/2008 | Hiraizumi et al. ......... | 382/190 |

FOREIGN PATENT DOCUMENTS

| | | |
|---|---|---|
| JP | 2000-324453 A | 11/2000 |
| JP | 2007-110223 A | 4/2007 |

OTHER PUBLICATIONS

Office Action dated Jan. 10, 2012 issued in counterpart Japanese Application 2007-317212.

* cited by examiner

*Primary Examiner* — Thai Tran
*Assistant Examiner* — Jose Mesa
(74) *Attorney, Agent, or Firm* — Rossi, Kimms & McDowell LLP

(57) ABSTRACT

An image editing apparatus capable of easily setting an aspect ratio for use when edited image data are output. The image editing apparatus includes a determination unit for determining, among a plurality of images, which of vertically long images or horizontally long images are larger in the number of images, a decision unit for deciding an aspect ratio of images which are the largest in the number of images among the vertically or horizontally long images, whichever are determined as being larger in number by the determination unit, and an output unit for outputting the plurality of images at the aspect ratio decided by the decision unit.

13 Claims, 12 Drawing Sheets

IMAGE EDITING APPARATUS, IMAGE EDITING METHOD, AND STORAGE MEDIUM STORING IMAGE EDITING PROGRAM

BACKGROUND OF THE INVENTION

1. Field of the Invention

The present invention relates to an image editing apparatus, an image editing method, and a storage medium storing an image editing program. More particularly, the present invention relates to an image editing apparatus and an image editing method for editing plural images and outputting the edited images as a moving image, and relates to a storage medium storing a program for causing a computer to execute the image editing method.

2. Description of the Related Art

There are a variety of standards for television broadcasting in the world. Typically, the NTSC system is used, for example, in the U.S.A. and Japan, and the PAL system is generally used in Europe. Aside from the television broadcasting standards, there is another moving image recording system such as a film movie system.

Since these standards are different in record image size, frame rate, etc., a moving image must be edited or converted before being output, so as to have an image size, etc. suited to the intended purpose of use. As such a moving image editing technique, Japanese Laid-open Patent Publication No. 2000-324453, for example, discloses a technique in which moving image data on movie film or the like is edited and stored for TV broadcast in the NTSC system or the PAL system, whichever is suitable for the intended purpose.

Heretofore, a moving image is usually watched on a TV screen, and therefore a moving image editing apparatus is usually designed to generate a moving image having an aspect ratio of 4:3 or 16:9.

With the popularization of digital cameras and digital video cameras, a moving image has recently been watched not only on a TV but also on a PC. Since an ordinary PC is able to handle moving images of aspect ratios of 4:3, 16:9, 11:9, etc., the moving image aspect ratio is not required to be fixed, unlike in the case of TV.

In addition, for the reason for example that vertically long images rotated 90 degrees can easily be photographed by a digital camera, there has been an increase in the frequency of handling vertically long moving images of aspect ratios of 3:4, 9:16, etc. This results in a situation that image data of various aspect ratios are mixedly present on a PC, which include horizontally long image data of aspect ratios of 4:3, 16:9, 11:9, etc. and vertically long image data of aspect ratios of 3:4, 9:16, 9:11, etc. which are 90-degree rotated compared to the horizontally long image data.

On the other hand, a conventional moving image editing apparatus as disclosed in Japanese Laid-open Patent Publication No. 2000-324453 is designed to output an image on a TV and therefore cannot meet the situation that various image sizes are mixedly present. In a case for example that vertically long image data is edited into horizontally long image data of aspect ratio of 4:3, black bars appear on the left and right sides of an output image, posing a problem that an appropriate moving image desired by a user cannot be obtained.

By using an arrangement configured to permit the user to set an arbitrary output image size, it may be possible to output a moving image at an aspect ratio at which the black bars around the image are minimized. However, in editing image data of various aspect ratios, the user is required to determine an appropriate aspect ratio for each individual image to be output, which poses a problem that operations become too complicated.

In brief, conventional moving image editing apparatuses cannot provide any guideline for the user to determine what image size (aspect ratio) should be used in editing image data of various aspect ratios currently used on a PC, resulting in a problem that the user may be confused.

SUMMARY OF THE INVENTION

The present invention provides an image editing apparatus and an image editing method capable of easily setting a proper aspect ratio for output of edited image data, and provides a storage medium storing a program for causing a computer to execute the image editing method.

According to a first aspect of this invention, there is provided an image editing apparatus comprising a determination unit adapted to determine, among the plurality of images, which of vertically long images or horizontally long images are larger in terms of one of number of images, number of frames, and playback times, a decision unit adapted to decide an aspect ratio of images which are large in terms of one of number of images, number of frames, and playback times among the images determined as being larger by the determination unit, and an output unit adapted to output the plurality of images at the aspect ratio decided by the decision unit.

According to a second aspect of this invention, there is provided an image editing method for editing a plurality of images comprising a determination step of determine, among the plurality of images, which of vertically long images or horizontally long images are larger in terms of one of number of images, number of frames, and playback times, a decision step of deciding an aspect ratio of images which are large in terms of one of number of images, number of frames, and playback times among the images determined as being larger in the determination step, and an output step of outputting the plurality of images at the aspect ratio decided in the decision step.

According to a third aspect of this invention, there is provided a storage medium that computer-readably stores a program for causing a computer to execute the image editing method according to the second aspect of this invention.

According to this invention, an aspect ratio at which images are output is selected in two stages on the basis of image data to be edited, whereby an appropriate aspect ratio at which images are output can easily be set.

As a result, the user is enabled to output appropriate images with less black bars, and the efficiency of output setting operations in the image editing can be improved.

Further features of the present invention will become apparent from the following description of an exemplary embodiment with reference to the attached drawings.

DETAILED DESCRIPTION OF THE PREFERRED EMBODIMENT

The present invention will now be described in detail below with reference to the drawings showing a preferred embodiment thereof.

Figure 1:
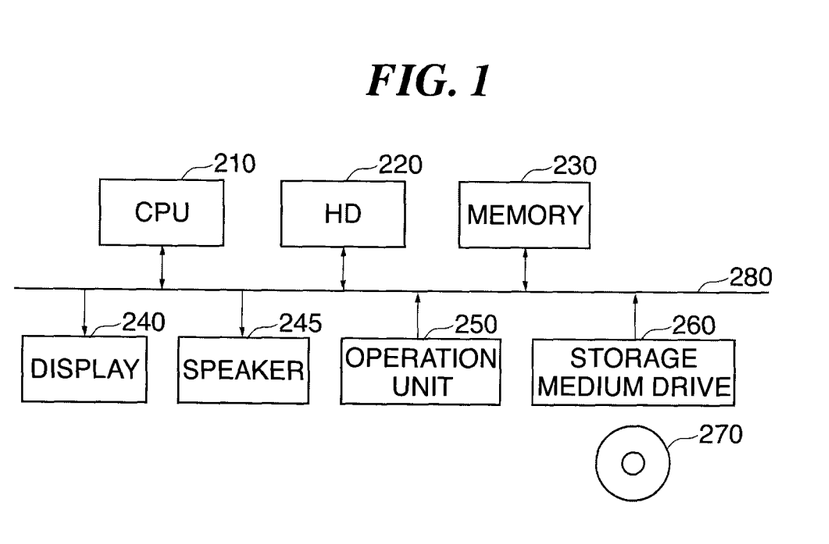
FIG. 1 is a block diagram showing the construction of an image editing apparatus according to one embodiment of this invention.

FIG. 1 shows in block diagram the construction of a moving image editing apparatus according to one embodiment of this invention.

This moving image editing apparatus is configured that a plurality of image files are designated to define a playback sequence and edit results are output or saved as a moving image file. The editing apparatus is also configured that rotation settings on moving images can be made.

As shown in FIG. 1, the moving image editing apparatus of this embodiment includes an arithmetic processing unit (hereinafter referred to as the CPU) 210 for controlling the operation of the editing apparatus, a hard disk 220 for recording a program and digital data such as image data, and an internal memory 230. The editing apparatus further includes a display section (hereinafter referred to as the display) 240 such as a CRT display or a liquid crystal panel, a speaker 245 for audio output, and an operation unit 250 comprised of a keyboard, a mouse, a touch panel, etc. The editing apparatus further includes a storage medium drive 260 for reading data from an external recording medium 270 such as a CD-ROM and a DVD-ROM. The above described units of the editing apparatus are connected with one another via an internal bus 280 such as a PCI bus.

A moving image editing program for controlling the moving image editing apparatus is stored in the hard disk 220 as a program code readable by the CPU 210. The CPU 210 reads the program code and executes an image editing process in FIG. 2 and an image size setting process in FIG. 3, which will be described later.

It should be noted that the moving image editing program may be stored in the external recording medium 270 such as a CD-ROM. In that case, the program is read out via the recording medium drive 260 and implemented by the CPU 210. This embodiment is also applicable to a case where the moving image editing program is on a network.

Next, the outline of operation of the moving image editing apparatus of this embodiment will be described.

Figure 2:
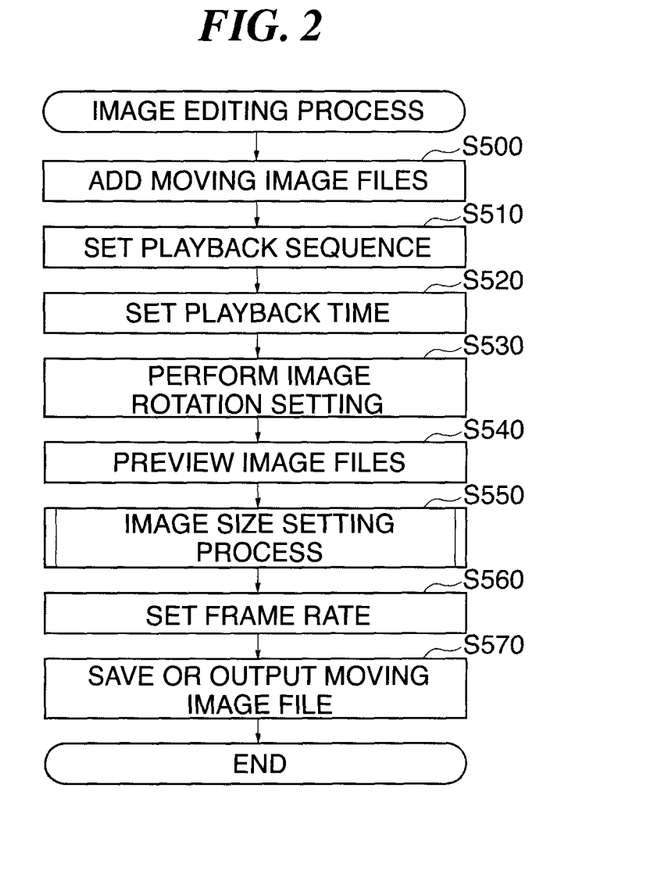
FIG. 2 is a flowchart showing the procedures of an image editing process implemented by a CPU in FIG. 1.

FIG. 2 shows in flowchart the procedures of the moving image editing process implemented by the CPU 210.

In the image editing process in FIG. 2, a moving image editing screen (FIG. 4) is displayed on the display 240 for manipulation by a user. At that time, plural buttons are displayed in an area 4-A of the moving image editing screen. Among these, only an addition button is ready for use, and the other buttons cannot be used.

Figure 4:
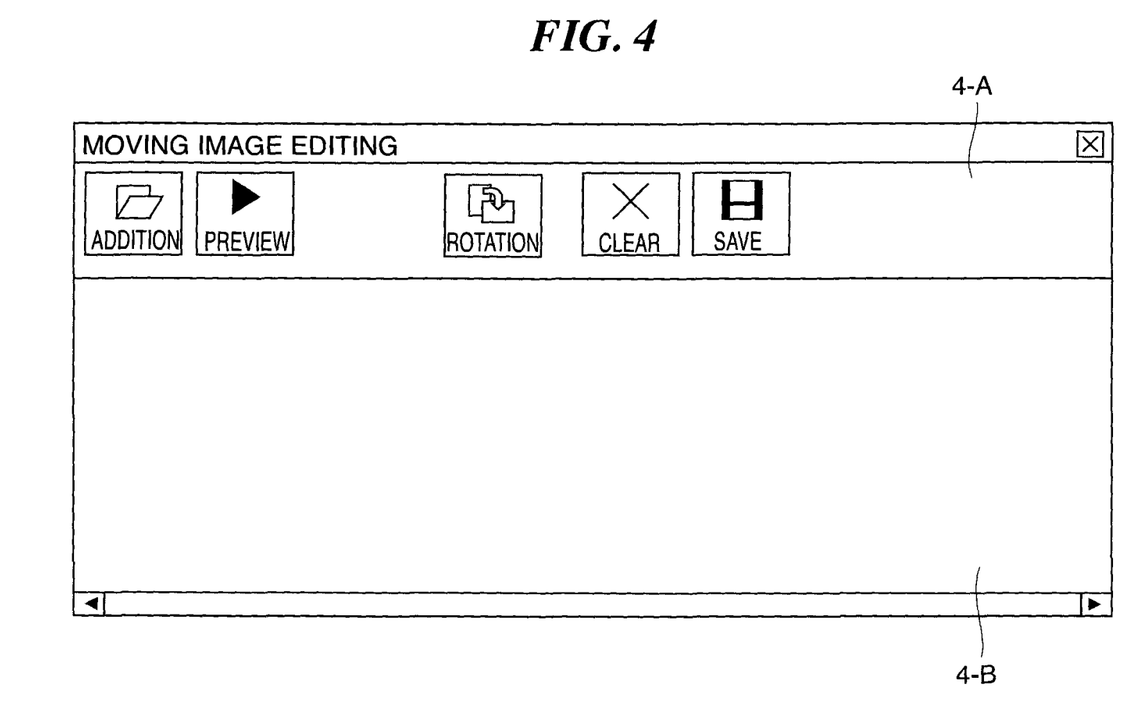
FIG. 4 is a view showing a moving image editing screen displayed on a display of the image editing apparatus in FIG. 1.

When the addition button on the moving image editing screen in FIG. 4 is depressed by the user, a file selection dialogue (not shown) is displayed on the display 240, thereby permitting the user to select a moving image file in the hard disk 220.

When one or more moving image files are selected by the user on the file selection dialogue, the moving image files are added as moving images to be edited (step S500).

The file selection dialogue used in the step S500 is, for example, a standard file open dialogue provided by the OS (operating system), with which plural files can be selected at a time.

Figure 5:
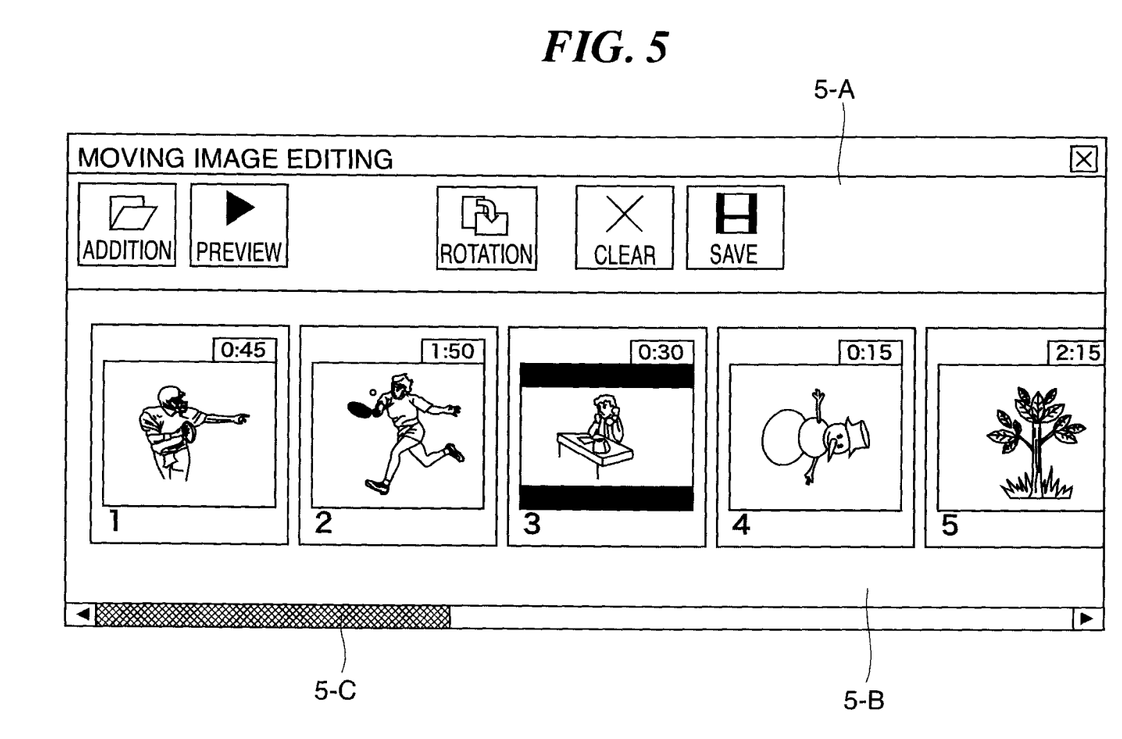
FIG. 5 is a view showing the moving image editing screen in a state that thumbnail images are displayed thereon.

When the moving image files are added, thumbnail images corresponding to respective ones of the added moving image files are displayed on an area 5-B in FIG. 5, which corresponds to an area 4-B in FIG. 4. The thumbnail images are prepared, for example, by scaling down head images of respective moving image data. Alternatively, images other than the head images can be used as thumbnail images.

Referring to FIG. 5, the thumbnail images displayed in the area 5-B are, e.g., five in number. These thumbnail images are played back in the sequence, e.g., from left to right as viewed in FIG. 5. Numbers representing the playback sequence are indicated at lower left portions of the thumbnail images for ease of understanding of the playback sequence. A playback time of each moving image data is also indicated, for example, at an upper right portion of each thumbnail image for ease of understanding of the playback times of moving image data respectively corresponding to the thumbnail images.

If the added moving image files are large in number and all the thumbnail images cannot be displayed on the screen at a time, a scroll bar 5-C is indicated at a lower part of the screen (FIG. 5). Using the scroll bar 5-C, the screen can be scrolled to sequentially display thumbnail images not yet displayed on the screen.

As a result of the moving image files being added, buttons not usable in the image file adding step (step S500) such as for example a preview button and a save button among the buttons displayed on an area 5-A at upper part of the screen (FIG. 5) become usable.

Next, in accordance with a user's instruction, the playback sequence of the image files is set (step S510).

Specifically, the user performs a manipulation for setting the playback sequence. For example, the user clicks with the mouse the desired thumbnail image among the thumbnail images displayed on the area 5-B of the moving image editing screen, and changes the order of the thumbnail images.

Figure 6:
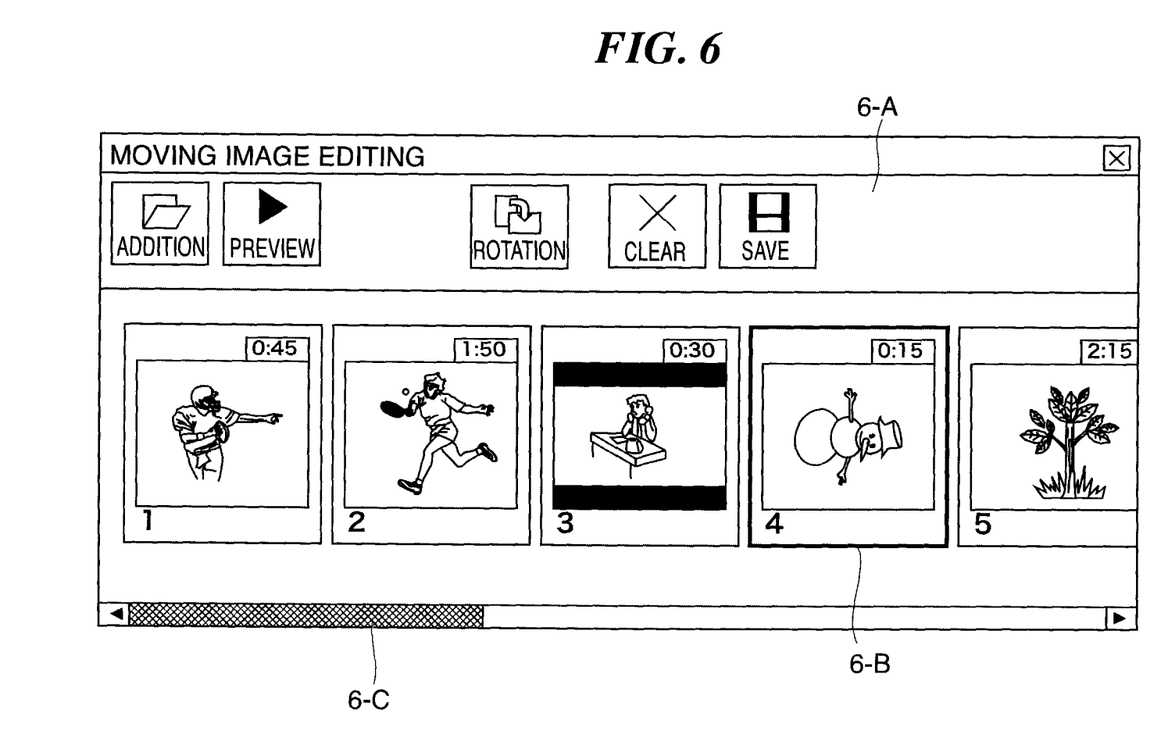
FIG. 6 is a view showing the moving image editing screen in a state that one thumbnail image is selected thereon.

When the desired thumbnail image is selected by the user from among the thumbnail images displayed on the area 5-B, a part around the selected thumbnail image is indicated in a different color or the selected thumbnail image is surrounded by a bold frame, whereby the selected thumbnail image is distinguished from the other thumbnail images (FIG. 6). In FIG. 6, the selected thumbnail image is the fourth image as counted from the leftmost image.

By performing a drag-and-drop manipulation on the selected thumbnail image with the mouse, etc., the user changes the order in which thumbnail images are arranged. The selected order of the thumbnail images corresponds to the playback sequence of the image files. In accordance with the order in which the images are arranged by the user, the CPU 210 sets the playback sequence of the moving image files (step S510). When any of the thumbnail images is selected, all the buttons in an area 6-A in the moving image editing screen (FIG. 6) become ready for use.

In a state the desired thumbnail image is selected, when the user clicks a corresponding playback time button (the time display part at the upper right portion of the selected thumbnail image in FIG. 6), the setting of playback time becomes possible (step S520).

Figure 7:
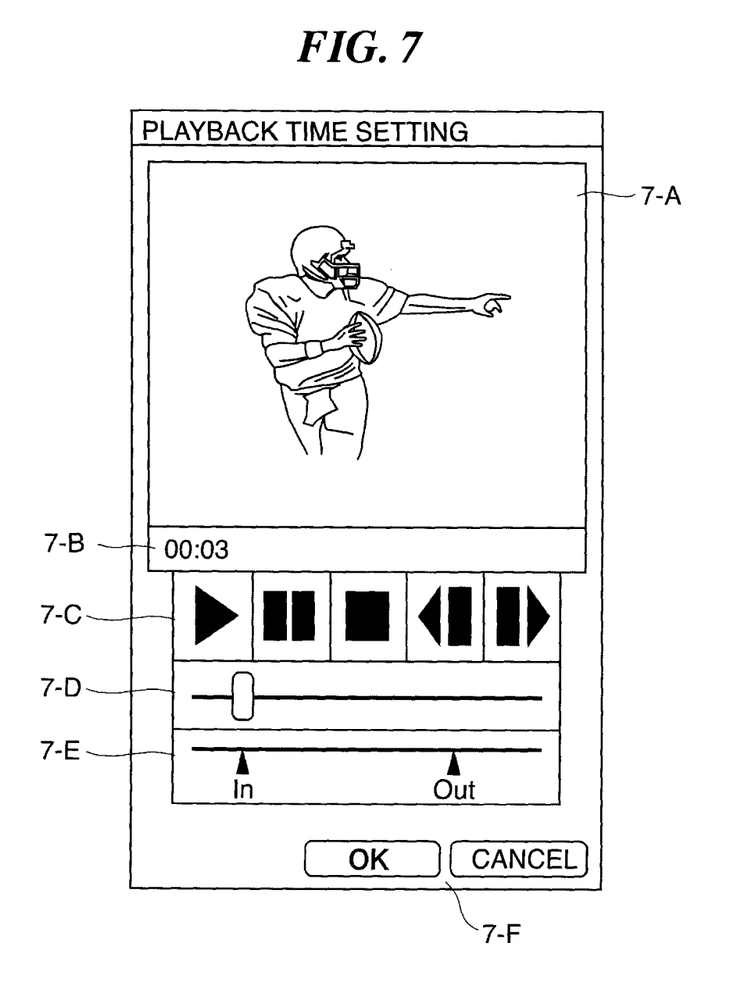
FIG. 7 is a view showing a playback time setting dialogue displayed on the display of the image editing apparatus.

When the playback time button is clicked by the user, a playback time setting dialogue is displayed on the display 240, and the setting of the playback time corresponding to the selected moving image file is made possible (FIG. 7).

In an area 7-A of the playback time setting screen in FIG. 7, there is displayed a preview screen for a moving image file for which playback time is to be set. This moving image file corresponds to the selected thumbnail image.

In an area 7-B, a time indication is displayed, which indicates a time-based playback position measured from the head of the moving image file for which playback time is to be set. The time indication is renewed in accordance with the playback position of the moving image being played back.

In an area 7-C, five playback control buttons are displayed. Specifically, a playback button, a pause button, a stop button, a frame return button, and a frame advance button are displayed in this order as viewed from the left in FIG. 7. By using these buttons, the user controls the playback time on the preview screen.

In an area 7-D, a playback slider is displayed. The playback slider has a knob whose position indicates the playback position of the moving image file. The user is able to freely move the playback position by moving the knob of the playback slider.

In an area 7-E, there is displayed a time setting controller having two knobs, i.e., In and Out knobs on the left and right sides for setting an in point and an out point, respectively. The user moves the knobs to desired positions to thereby set the in and out points of the moving image.

In an area 7-F, an OK button and a cancel button are displayed. To fix the setting of the playback time, the user depresses the OK button to close the dialogue. To cancel the setting of the playback time, the user depresses the cancel button to close the dialogue. Thus, the setting of playback time is performed using the playback time setting dialogue.

When an instruction for setting the playback time is given by the user, the CPU 210 sets the playback time of the corresponding moving image file in accordance with the instruction.

Next, image rotation setting is performed in accordance with a user's instruction (step S530).

Figure 8:
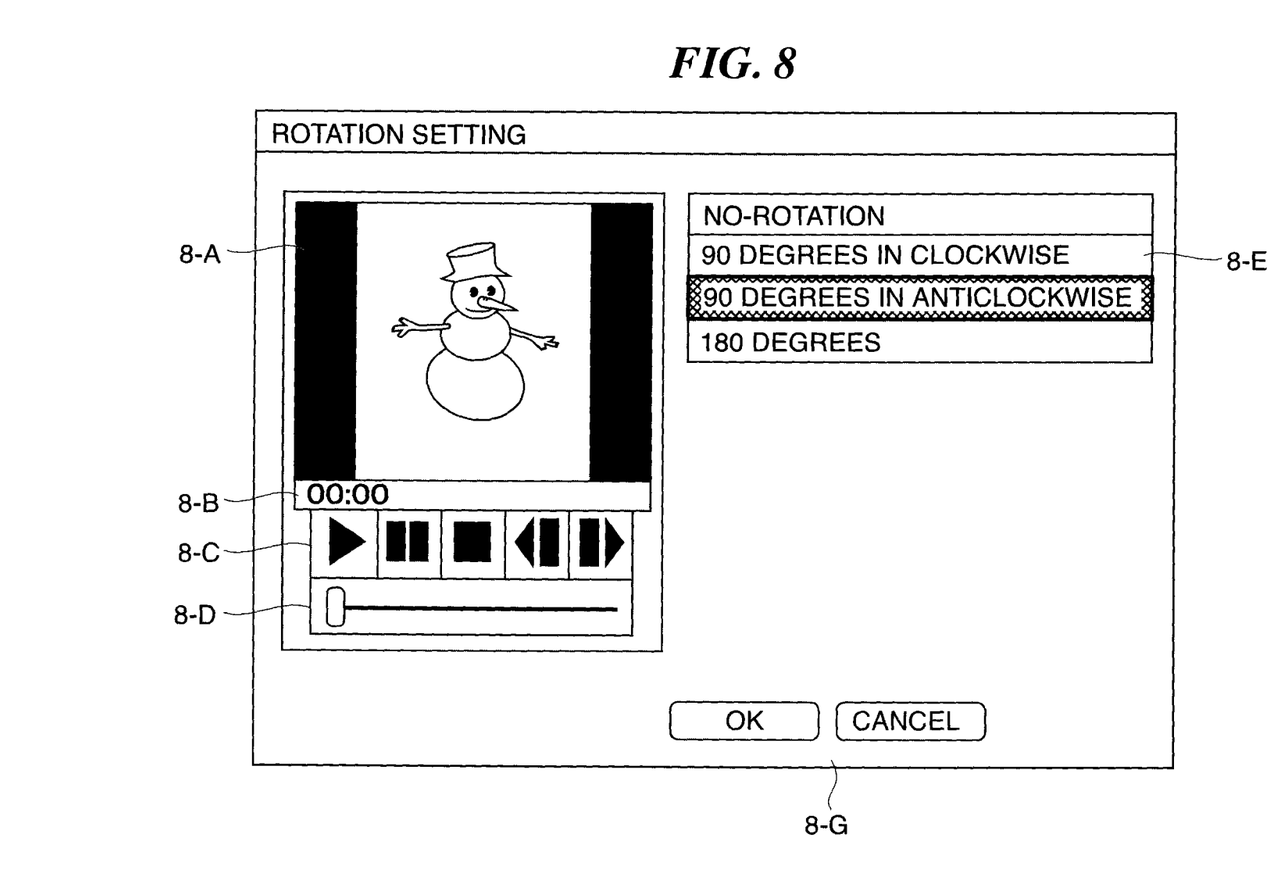
FIG. 8 is a view showing an image rotation setting dialogue displayed on the display of the image editing apparatus.

When the rotation button (FIG. 6) is clicked by the user in a state the desired thumbnail image is selected, a rotation setting dialogue is displayed on the display 240, whereby the rotation setting for the selected moving image file is made possible (FIG. 8).

An area 8-A of the image rotation setting screen in FIG. 8 is a preview screen on which is displayed a thumbnail image corresponding to an image file to be subjected to the rotation setting. Areas 8-B, 8-C and 8-D are the same as the areas 7-B, 7-C and 7-D in FIG. 7 and have the same functions as those of the areas 7-B, 7-C and 7-D. Thus, a description thereof is omitted.

In an area 8-E in FIG. 8, a rotation setting controller is displayed, which is setting means for achieving the desired image rotation. The user performs the image rotation setting by depressing any of a no-rotation button, a 90-degree clockwise rotation button, a 90-degree anticlockwise rotation button, and a 180-degree rotation button.

For ease of understanding a setting state currently selected by the user, the rotation button of the rotation setting controller currently selected for the rotation setting may be indicated in different color or may be surrounded by a bold frame, for example. In FIG. 8, the 90-degree anticlockwise rotation button is surrounded by a bold frame, whereby the user can recognize at a glance that the 90-degree anticlockwise rotation is currently selected. It should be noted that no-rotation, for example, is set in the default rotation setting. The rotation setting controller may be configured to be able to designate other rotation setting than the above described rotation setting.

When an image rotation setting condition is selected by the user, an image obtained by subjecting the selected image to the rotation processing with the selected rotation angle is displayed on the preview screen 8-A. Based on the image displayed on the preview screen, the user is able to recognize the current setting condition.

In an area 8-G of the rotation setting dialogue in FIG. 8, there are displayed an OK button and a cancel button. To fix the image rotation setting, the user depresses the OK button to close the dialogue. When the OK button is clicked by the user, the CPU 210 displays the thumbnail image (image rotation processing object) after the rotation processing (FIG. 9) on the moving image editing screen in FIG. 6.

Figure 9:
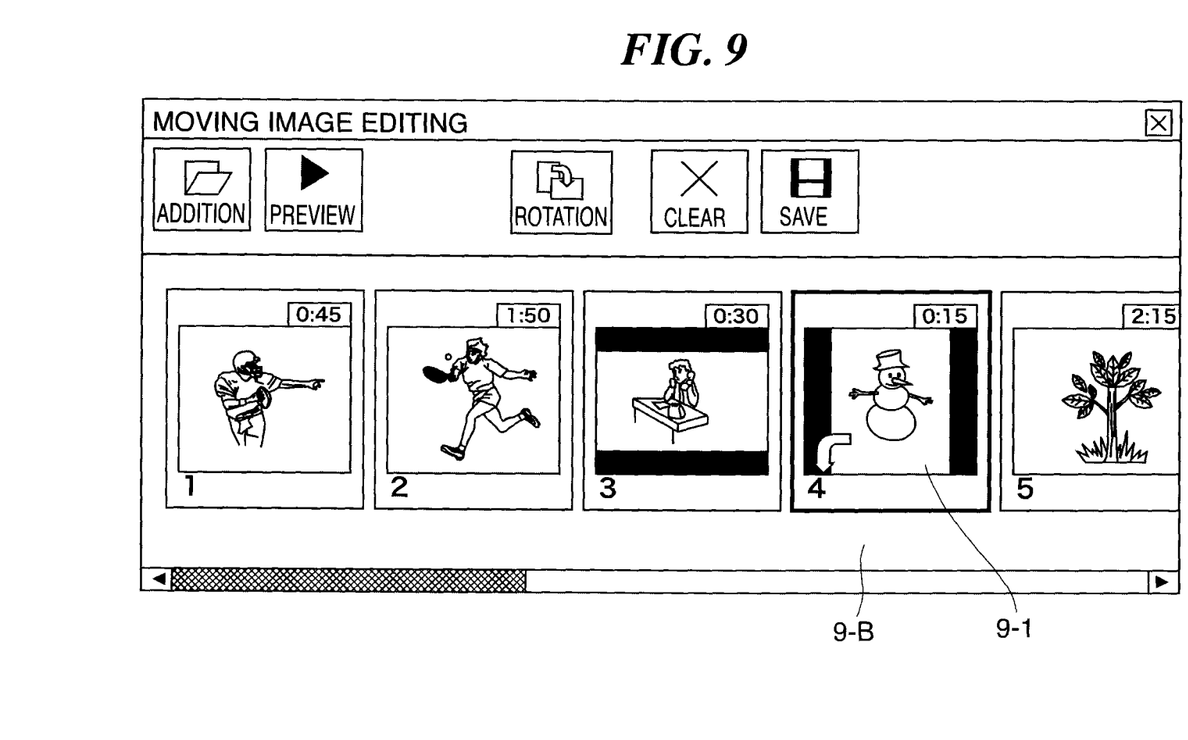
FIG. 9 is a view showing the moving image editing screen in a state that a rotation-processed thumbnail image is displayed thereon.

In an area 9-B of the moving image editing dialogue in FIG. 9, the thumbnail image 9-1 after the rotation processing is indicated. The thumbnail image 9-1 for which the rotation setting has been made is displayed with rotation while its aspect ratio is kept unchanged. For ease of understanding that the image rotation setting has been made, a rotation mark is indicated at a lower left portion of the thumbnail image 9-1. On the other hand, when the cancel button is clicked by the user, the image rotation setting is cancelled in accordance with the instruction and the dialogue is closed.

It should be noted that when the 90-degree clockwise rotation setting or 90-degree anticlockwise rotation (270-degree clockwise rotation) setting is made on an image, the image size or the aspect ratio of that image may inversely be handled according to a display state of the original image in the operation of this embodiment. This makes it possible to display an image, which is a vertically long image before being subjected to the rotation process, as a vertically long image even after subjected to the rotation process, and display an image, which is horizontally long image before being subjected to the rotation process, as a horizontally long image even after subjected to the rotation process.

Next, the following preview dialogue display operation is carried out in accordance with a user's instruction.

Specifically, after the playback sequence setting (step S510), the playback time setting (step S520) and the image rotation setting (step S530) are performed, the user clicks the preview button (FIG. 6) with the mouse, for example. When the preview button (FIG. 6) is clicked, a preview dialogue is displayed on the display 240 and the added moving image files are played back in sequence (FIG. 10) (step S540), whereby the user is able to confirm all the settings.

Figure 10:
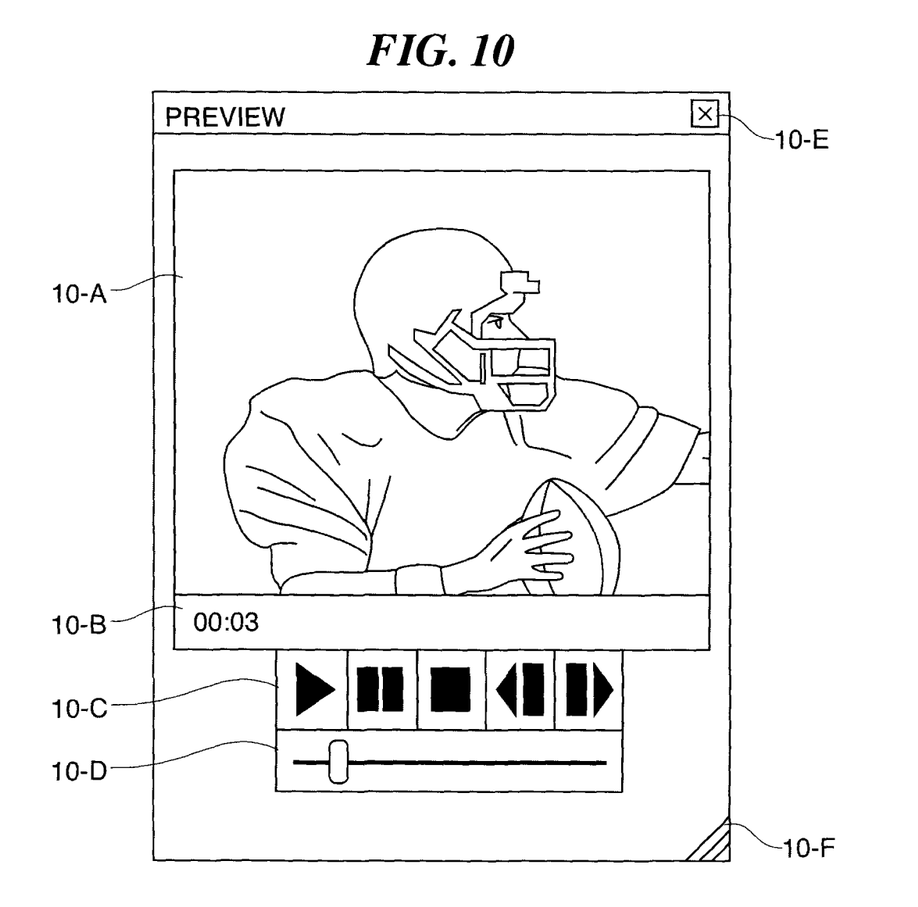
FIG. 10 is a view showing a preview screen displayed on the display of the image editing apparatus.

Referring to FIG. 10, the preview dialogue includes an area 10-A which is a preview screen. On the preview screen, the added moving image files reflecting all the settings are sequentially played back and displayed. Areas 10-B, 10-C and 10-D are basically the same as the areas 7-B, 7-C and 7-D in FIG. 7. It should be noted that in the preview dialogue, the moving image files are not played back one by one, but the added moving image files are handled in bundle and played back. In an area 10-E, there is indicated a close button for closing the preview dialogue. Symbol 10-F denotes a controller for changing the window size of the preview dialogue. By manipulating the controller 10-F, the size of images displayed on the preview screen can be changed, and the images can be played back and displayed with the image size after the change.

As described above, the CPU 210 performs the operations from the image file addition (step S500) to the preview dialogue display (step S540) in accordance with the user's instructions.

Subsequent to manipulations for the steps S500 to S540 (editing manipulations), the user clicks a save button on the moving image editing screen (see FIG. 6), thereby instructing the saving of the edit results. When the save button is clicked by the user, a save dialogue (FIG. 11) is displayed on the display 240, whereby save processing on the moving image files becomes possible. In the save processing, the edit results set in the steps S500 to S540 are saved in the form of one moving image file.

Figure 11:
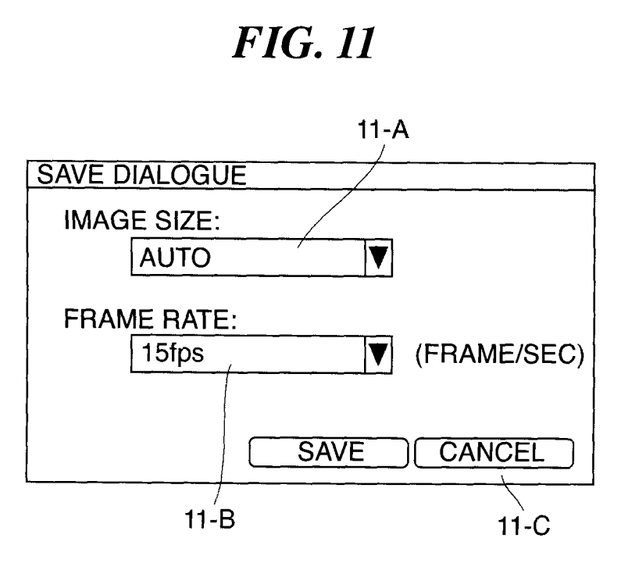
FIG. 11 is a view showing a save dialogue displayed on the display of the image editing apparatus.

Referring to FIG. 11, the save dialogue includes a list box 11-A for setting the image size at which the moving image files are saved. When the list box 11-A is clicked by the user, the CPU 210 displays a menu of selectable image sizes. Among the image sizes indicated in the menu, the user selects the image size at which the files are to be saved.

As the selectable image sizes (aspect ratios), there may be mentioned, for example, seven types of image sizes (aspect ratios) which include auto; 320×240 (4:3); 320×180 (16:9); 352×288 (11:9); 240×320 (3:4); 180×320 (9:16); and 288× 352 (9:11).

When a desired image size is selected by the user, the CPU 210 carries out an image size setting process (step S550), described later with reference to FIG. 3, in accordance with the image size selected by the user. The size at which images are saved is not limited to one of the above described seven types, but may be any size other than these. There may be used an arrangement that enables the user to set an arbitrary image size.

After setting the image size, the user clicks a frame rate setting list box 11-B on the save dialogue screen in FIG. 11, thereby selecting a frame rate (step S560). When the frame rate setting list box 11-B is clicked by the user, a menu of selectable frame rates is displayed. As the selectable frame rates, there may be mentioned 15, 20, and 30 (fps), for example. Out of these, the user selects the frame rate to be set.

In accordance with the frame rate selected by the user, the CPU 210 sets the frame rate. In that case, a menu may be displayed, in which frame rates other than the above described ones are indicated for selection. There may be used an arrangement that enables the user to select an arbitrary frame rate.

After selecting the image size and the frame rate, the user clicks a save button displayed in an area 11-C on the save dialogue screen in FIG. 11 to finalize the settings to be saved and save the edit results in the form of a moving image file.

When the save button is clicked by the user, a standard file save dialogue (not shown) provided by the OS, for example, is displayed to enable the user to set a location and a file name at and with which the moving image file is to be saved. When the location and name of the file to be saved are set by the user, the edit results are saved or output in the form of a moving image file in accordance with the set conditions (step S570), and the present process is completed.

The saved image file is played back, where required, by an image playback unit (e.g., OS standard moving image playback software), and then displayed and output. Alternatively, the saved image file is output by an image output unit (e.g., network connection). To cancel the saving, a cancel button is depressed by the user. In that case, the save dialogue is closed without saving the edited images, and the present process is completed.

The above described set items on the moving image file to be saved consist of the save file name, save location, image size, and frame rate, but may include other items than these.

With the process in FIG. 2, image files are added (step S500), edit conditions are set (steps S510 to S530), an image size is set (step S550), and a moving image file is saved (step S570). With these processing, it is possible for example to output the edited image at a selected image size.

Figure 3:
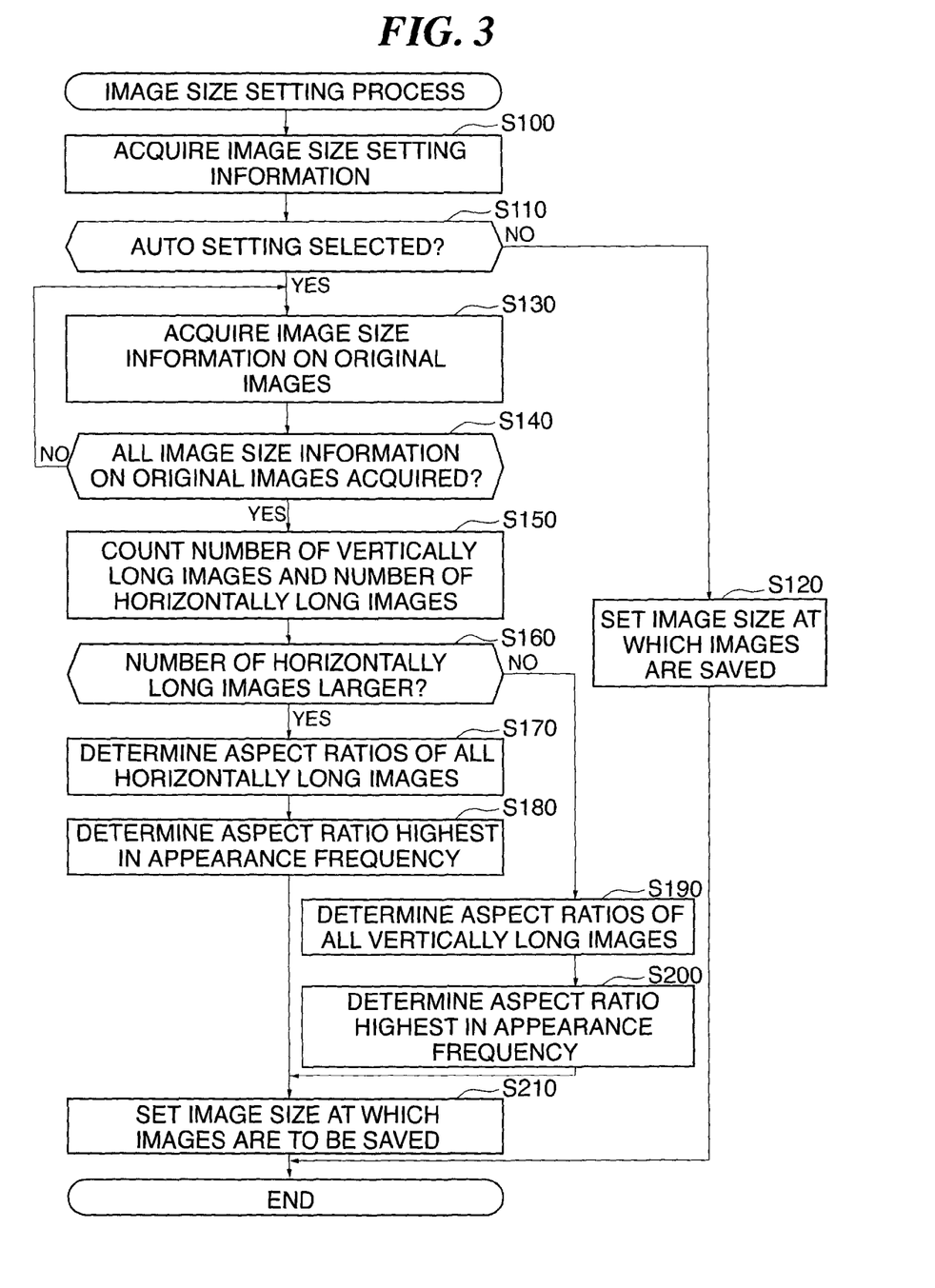
FIG. 3 is a flowchart showing the procedures of an image size setting process implemented at step S550 in FIG. 2.

FIG. 3 shows in flowchart the procedures of the image size setting process performed in step S550 in FIG. 2.

When the selection of image size is made by the user on the list box 11-A of the save dialogue screen in FIG. 11, the CPU 210 first acquires setting information on the image size selected by the user (step S100). Next, it is determined whether or not the acquired setting information indicates that the auto setting of image size is selected (step S110). If the auto setting is selected, the image size at which images are to be saved is automatically set, as described later. On the other hand, if the auto setting is not selected, but any specific aspect ratio (image size) is selected, the image size at which images are to be saved is set in accordance with the setting information acquired in the step S100 (step S120), and the present process is completed.

If it is determined at the step S110 that the auto setting is selected, image size information on the moving image files (the original images) to be edited are acquired one by one (step S130). At this time, the vertical and horizontal image sizes of an image for which 90-degree or 270-degree rotation processing is set are conversely handled since the image for which the rotation processing is set is rotated at the time of being output or saved, with the original image remaining unrotated. Thus, an image whose original image is a vertically long image can be edited, saved, or the like as a horizontally long image, and an image whose original image is a horizontally long image can be edited, saved, or the like as a vertically long image.

After the image size information is acquired (step S130), it is determined whether or not all the image size information on the moving image files to be edited are acquired (step S140). If it is determined that all the image size information are not acquired as yet, the process returns to the step S130 and the processing in the steps S130 and S140 is repeated, whereby image size information on all the moving image files to be edited are acquired.

If it is determined at the step S140 that all the image size information are acquired, it is determined whether each moving image file is a vertically long image or a horizontally long image based on the image size information on the image file, and the number of vertically long images and the number of horizontally long images are counted (step S150). At this time, an image whose vertical and horizontal lengths are the same as each other is not counted. In other words, such an image is regarded as being neither a vertically long image nor a horizontally long image. An image having a vertical length thereof close to its horizontal length or having an aspect ratio thereof close to 1, which is nearly square in shape, may also be regarded as being neither a vertically long image nor a horizontally long image, and may not be counted.

After the number of vertically long moving images and the number of horizontally long moving images are counted, it is determined which of the vertically long images or the horizontally long images are larger in number (step S160). If, for example, the number of the horizontally long images is larger than that of the vertically long images, the aspect ratios of all the horizontally long images are determined (step S170). If the number of the vertically long images is equal to that of the horizontally long images, the aspect ratios of predetermined higher-priority images (e.g., horizontally long images) are determined. In the step S170, out of the seven types of image sizes (aspect ratios), i.e., 4:3, 16:9, 11:9, 3:4, 9:16, 9:11 and others, for example, the CPU 210 determines the number of image sizes (aspect ratios) of horizontally long images. In this example, there are four types of image sizes of horizontally long images, i.e., 4:3, 16:9, 11:9 and others in terms of aspect ratio.

Next, an aspect ratio is determined, which is highest in appearance frequency among the aspect ratios determined in the step S170 (step S180). Then, the aspect ratio determined to be highest in appearance frequency is set as the image size at which images are to be saved (step S210), and the present process is completed.

If it is determined at the step S180, for example, that the horizontally long images having aspect ratio of 4:3 are the largest in number among the horizontally long images contained in the moving image files, the image size at which images are to be saved is set to, e.g., 320×240 (step S210). On the other hand, if it is determined that the horizontally long images having aspect ratio of 16:9 are the largest in number, the image size at which images are saved is set to, e.g., 320×180. If the horizontally long images having aspect ratio of 11:9 are the largest in number, the image size at which images are saved is set to, e.g., 352×288 (step S210).

If horizontally long images having an aspect ratio other than the aforementioned three types of aspect ratios are the largest in number among the horizontally long images contained in the moving image files, the image size at which images are saved is set, for example, to 320×240. If there are plural types of horizontally long aspect ratios which are each the largest in appearance number, the image size (aspect ratio) at which files are to be saved is set according to, for example, a predetermined priority order of 4:3, 16:9 and 11:9. The priority order is not limited to the above order, and another criterion may be used.

If it is determined at the step S160 that the number of vertically long images is larger than the number of horizontally long images, the CPU 210 determines the aspect ratios of all the vertically long images (step S190). For example, the CPU 210 determines the number of horizontally long images having any of four types of aspect ratios, i.e., 3:4, 9:16, 9:11 and others, out of the seven types of aspect ratios, i.e., 4:3, 16:9, 11:9, 3:4, 9:16, 9:11 and others.

Next, an aspect ratio is determined, which is highest in appearance frequency among the aspect ratios determined in the step S190 (step S200). As in the case of horizontally long images, the aspect ratio determined to be highest in appearance frequency is set as the image size at which images are to be saved (step S210), and the present process is completed.

If it is determined at the step S200, for example, that the vertically long images having aspect ratio of 3:4 are the largest in number among the vertically long images contained in the moving image files, the image size at which images are to be saved is set to, e.g., 240×320 (step S210). On the other hand, if it determined that the vertically long images having aspect ratio of 9:16 are the largest in number, the image size at which images are saved is set to, e.g., 180×320. If the vertically long images having aspect ratio of 9:11 are the largest in number, the image size at which images are saved is set to, e.g., 288×352 (step S210).

With the process shown in FIG. 3, the image sizes of the original images are acquired (step S130), which of horizontally long images and vertically long images are larger in number is determined (step S160), and an image size is selected at which images are to be saved and which corresponds to the aspect ratio which is the highest in appearance frequency among the aspect ratios of the determined horizontally or vertically long images (steps S180 and S200). As a result of these processing, the optimum image size (aspect ratio) for the images being edited can easily be set.

According to this embodiment, since the aspect ratio at which the moving image files are to be saved is determined in two stages on the basis of the image sizes of the moving image files to be edited, black bar parts in the edited images can be reduced, and the moving image files can be saved and output at an appropriate aspect ratio. Therefore, the user is enabled to automatically save and output appropriate moving image files with less black bars, and the efficiency of output setting operations in editing the moving images can be improved. If the image rotation setting is performed by the user, the aspect ratio is determined according to image rotation angle, and it is therefore possible to carry out appropriate processing without the need of complicated manipulations. The moving image editing apparatus of this embodiment is particularly useful in a case where images of various aspect ratios are mixedly present in the images to be edited.

In this embodiment, there has been described the example where either vertically long images or horizontally long images, whichever are larger in the number of images, are selected, but the present invention is not limited thereto. For example, vertically long images or horizontally long images may be selected, whichever are longer in image playback times or larger in the number of image frames.

Also the selection of the image size (aspect ratio) at which images are to be saved may not be made based on the number of images, but may be made based on either the image playback times or the number of image frames.

In this embodiment, the example has been described where moving image data is output in the form of a file. However, it may be possible to playback and output the moving image data to generate a preview output.

In this embodiment, the example has been described where image editing is performed using application software. However, this invention is not limited thereto and may be applied to a case where the image editing is performed by a camera main unit. In that case, the operation unit of the image editing apparatus may be implemented by a plurality of buttons provided in the camera main unit.

In this embodiment, there has been described the example where the images to be edited are moving images. However, this invention is not limited thereto and may be configured to handle still image files as well as moving image files or handle still image files alone.

Figure 12:
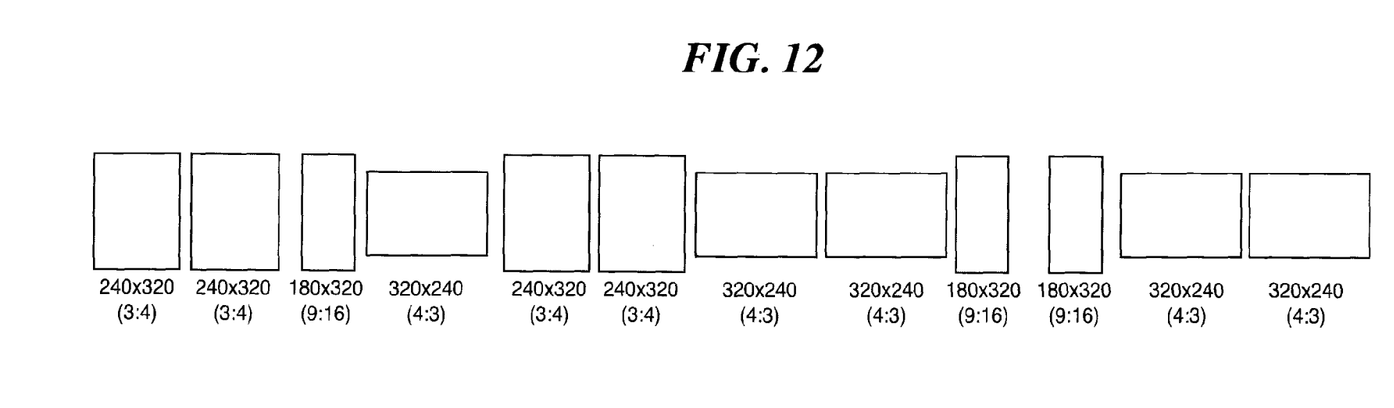
FIG. 12 is a view showing all the images to be edited and image sizes thereof in a concrete example of this invention.

Next, a description will be given of a concrete example of this invention where twelve moving image files shown in FIG. 12 are added to and edited for output by the image editing apparatus.

Referring to FIG. 12, the added moving image files include five moving files each having an aspect ratio of 4:3, four moving image files each having an aspect ratio of 3:4, and three moving image files each having an aspect ratio of 9:16.

In this example, if the appearance frequencies of aspect ratios of moving image files to be edited are simply compared with one another and the aspect ratio which is the highest in appearance frequency is selected for file saving, then the moving image files are saved at an aspect ratio of 4:3. However, among the moving image files to be edited, the number of vertically long images is larger than the number of horizontally long images, and therefore many moving image files with black bars are output, if the image files are each saved at an aspect ratio of 4:3 in the form of a horizontal long image.

To obviate this, in this example, the number of vertically long images is first compared with the number of horizontally long images in steps S130 to S160 in FIG. 3. As a result, it is determined that the number of vertically long images is larger than that of horizontally long images. Specifically, the number of horizontally long images is five, which are only comprised of images having aspect ratio of 4:3. On the other hand, the number of vertically long images is seven in total, which are comprised of images having aspect ratio of 3:4 and images having aspect ratio of 9:16. Since the number of vertically long images is larger than that of horizontally long images, it is determined that the moving image files should be saved at one of those vertically long aspect ratios.

Next, the aspect ratios of the vertically long images in FIG. 12 are determined (step S190), and which of the aspect ratios is highest in appearance frequency is determined (step S200). As a result, it is determined that the number of the moving image files having aspect ratio of 3:4 is larger than that of the moving image files having aspect ratio of 9:16. On the basis of this determination result, the image size at which the images are to be saved is set to the vertically long aspect ratio of 3:4 (step S210).

Thus, the desired aspect ratio for use when the edited image data are output can easily be set.

It is to be understood that the present invention may also be accomplished by supplying a system or an apparatus with a storage medium in which a program code of software, which realizes the functions of the above described embodiment is stored and by causing a computer (or CPU or MPU) of the system or apparatus to read out and execute the program code stored in the storage medium. In that case, the program code itself read from the storage medium realizes the functions of the above described embodiment, and therefore the program code and the storage medium in which the program code is stored constitute the present invention.

Examples of the storage medium for supplying the program code include a flexible disk, a hard disk, an optical disk, a magnetic-optical disk, a CD-ROM, a CD-R, a CD-RW, a magnetic tape, a nonvolatile memory card, a ROM, and a DVD.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2007-317212, filed Dec. 7, 2007 which is hereby incorporated by reference herein in its entirety.

What is claimed is:

1. An image editing apparatus for editing a plurality of images, comprising:
    a determination unit adapted to determine whether each of the plurality of images is a vertically long image or horizontally long image, determine a first count of the number of vertically long images and a second count of the number of horizontally long images, and select which is greater of the first count and the second count;
    a decision unit adapted to decide an aspect ratio based on the selection by said determination unit; and
    an output unit adapted to output the plurality of images at the aspect ratio decided by said decision unit.

2. The image editing apparatus according to claim 1, further including:
    a recording unit adapted to record the plurality of images, which are to be output by said output unit, in a form of one file.

3. The image editing apparatus according to claim 1, further including:
    a display unit adapted to sequentially display the plurality of images output from said output unit.

4. The image editing apparatus according to claim 1, wherein the plurality of images are comprised of vertically long images, or horizontally long images, or at least one vertically long image and at least one horizontally long image.

5. The image editing apparatus according to claim 1, including:
    an image rotation setting unit adapted to implement an image rotation setting on at least one desired image among the plurality of images; and
    an image rotating unit adapted to rotate the desired image in accordance with the setting implemented thereon by said image rotation setting unit when the desired image is output by said output unit,
    wherein each of said determination unit and said decision unit is adapted to inversely handle an aspect ratio of an image for which a 90-degree clockwise or anticlockwise rotation is set by said image rotation setting unit.

6. The image editing apparatus according to claim 1, wherein said determination unit is adapted to regard an image whose vertical length is equal to its horizontal length as being neither a vertically long image nor a horizontally long image.

7. The image editing apparatus according to claim 1, wherein said determination unit is adapted to regard an image whose vertical length is close to its horizontal length as being neither a vertically long image nor a horizontally long image.

8. An image editing method for editing a plurality of images, comprising:
    a determination step of determining whether each of the plurality of images is a vertically long image or horizontally long image, determine a first count of the number of vertically long images and a second count of the number of horizontally long images, and select which is greater of the first count and the second count;
    a decision step of deciding an aspect ratio based on the selection by said determination step; and
    an output step of outputting the plurality of images at the aspect ratio decided in said decision step.

9. A non-transitory storage medium that computer-readably stores a program for causing a computer to execute an image editing method, the image editing method comprising:
    a determination step of determining whether each of the plurality of images is a vertically long image or horizontally long image, determine a first count of the number of vertically long images and a second count of the number of horizontally long images, and select which is greater of the first count and the second count;

a decision step of deciding an aspect ratio based on the selection by said determination step; and an output step of outputting the plurality of images at the aspect ratio decided in said decision step.

10. The image editing apparatus according to claim 1, wherein the plurality of images include a movie, and each of the plurality of images includes a frame of the movie.

11. An image editing apparatus for editing a plurality of images, comprising:

a determination unit adapted to determine whether each of the plurality of images is a vertically long image or horizontally long image, determine a first count of, for vertically long images, one of i) a number of images, ii) a number of frames and iii) a playback time, and determine a second count of, for horizontally long mages, one of i) a number of images, ii) a number of frames and iii) a playback time, and select which is greater of the first count and the second count;

a decision unit adapted to decide an aspect ratio based on the selection by said determination unit; and an output unit adapted to output the plurality of images at the aspect ratio decided by said decision unit.

12. A method of controlling an image editing apparatus for editing a plurality of images, the method comprising:

a determination step of determining whether each of the plurality of images is a vertically long image or horizontally long image, determining a first count of, for vertically long images, one of i) a number of images, ii) a number of frames and iii) a playback time, and determining a second count of, for horizontally long mages, one of i) a number of images, ii) a number of frames and iii) a playback time, and selecting which is greater of the first count and the second count;

a decision step of deciding an aspect ratio based on the selection by said determination step; and an output step of outputting the plurality of images at the aspect ratio decided by said decision step.

13. A non-transitory computer-readable storage medium, storing a program that, when executed by a computer, causes the computer to perform a method of controlling an image editing apparatus for editing a plurality of images, the method comprising:

a determination step of determining whether each of the plurality of images is a vertically long image or horizontally long image, determining a first count of, for vertically long images, one of i) a number of images, ii) a number of frames and iii) a playback time, and determining a second count of, for horizontally long mages, one of i) a number of images, ii) a number of frames and iii) a playback time, and selecting which is greater of the first count and the second count;

a decision step of deciding an aspect ratio based on the selection by said determination step; and an output step of outputting the plurality of images at the aspect ratio decided by said decision step.

* * * * *